United States Patent
Xu et al.

(10) Patent No.: US 10,223,438 B1
(45) Date of Patent: Mar. 5, 2019

(54) SYSTEM AND METHOD FOR DIGITAL-CONTENT-GROUPING, PLAYLIST-CREATION, AND COLLABORATOR-RECOMMENDATION

(71) Applicant: BroadbandTV, Corp., Vancouver (CA)

(72) Inventors: Di Xu, Richmond (CA); Mehrdad Fatourechi, Vancouver (CA); Shahrzad Rafati, Vancouver (CA)

(73) Assignee: BroadbandTV, Corp., Vancouver BC (CA)

(*) Notice: Subject to any disclaimer, the term of this patent is extended or adjusted under 35 U.S.C. 154(b) by 402 days.

(21) Appl. No.: 14/696,123

(22) Filed: Apr. 24, 2015

Related U.S. Application Data

(60) Provisional application No. 61/983,915, filed on Apr. 24, 2014.

(51) Int. Cl.
| | |
|---|---|
| *G06F 17/30* | (2006.01) |
| *H04N 21/262* | (2011.01) |
| *H04N 21/2668* | (2011.01) |
| *H04N 21/25* | (2011.01) |
| *H04N 21/234* | (2011.01) |

(52) U.S. Cl.
CPC .. *G06F 17/30598* (2013.01); *G06F 17/30876* (2013.01); *H04N 21/23418* (2013.01); *H04N 21/251* (2013.01); *H04N 21/2668* (2013.01); *H04N 21/26258* (2013.01)

(58) Field of Classification Search
CPC ........ G06F 17/30598; G06F 17/30876; H04N 21/23418; H04N 21/26258; H04N 21/2668; H04N 21/251

USPC ........... 707/5, 707, 708, 710, 737, 767, 705
See application file for complete search history.

(56) References Cited

U.S. PATENT DOCUMENTS

| | | | | |
|---|---|---|---|---|
| 8,117,216 | B1* | 2/2012 | Chanda | G06F 17/30991 707/737 |
| 8,566,370 | B2* | 10/2013 | Jin | G06F 17/30029 707/609 |
| 9,063,984 | B1* | 6/2015 | Sandland | G06F 17/3053 |
| 9,336,308 | B2* | 5/2016 | Yu | G10L 15/1815 |
| 2005/0149468 | A1* | 7/2005 | Abraham | H04L 41/0853 |
| 2006/0008247 | A1* | 1/2006 | Minami | G11B 27/034 386/280 |
| 2009/0138505 | A1* | 5/2009 | Purdy | G06F 17/30743 |
| 2010/0011388 | A1* | 1/2010 | Bull | H04N 21/41407 725/9 |
| 2010/0332485 | A1* | 12/2010 | Lahti | G06F 17/30058 707/758 |
| 2012/0158527 | A1* | 6/2012 | Cannelongo | G06Q 30/02 705/14.73 |
| 2015/0074722 | A1* | 3/2015 | Sinha | H04N 21/44222 725/46 |

(Continued)

*Primary Examiner* — Greta L Robinson
(74) *Attorney, Agent, or Firm* — Holzer Patel Drenna

(57) ABSTRACT

In accordance with one embodiment, a method can be implemented that includes receiving a plurality of digital assets as inputs; extracting one or more representative features of each digital asset; for a group based on one or more representative features, using the one or more representative features of each digital asset to calculate a relevancy score between each digital asset and the group; and using each relevancy score to determine whether each digital asset should be assigned to the group. Additional embodiments are also disclosed herein.

24 Claims, 13 Drawing Sheets

(56) References Cited

U.S. PATENT DOCUMENTS

2015/0242460 A1* 8/2015 Krishna ......... G06Q 10/063112
                                                                            707/723

* cited by examiner

US 10,223,438 B1

SYSTEM AND METHOD FOR DIGITAL-CONTENT-GROUPING, PLAYLIST-CREATION, AND COLLABORATOR-RECOMMENDATION

RELATED APPLICATIONS

This application claims the benefit under 35 U.S.C. § 119(e) of U.S. provisional patent application 61/983,915, filed on Apr. 24, 2014 which is hereby incorporated by reference in its entirety and for all purposes

SUMMARY

Some embodiments described herein may be utilized to provide systems and methods for quickly grouping digital media or channels that are relevant in content, popularity, and/or audience.

In one embodiment, topics are extracted for a group of digital media (such as videos, images, articles, presentations, and songs) based on the metadata, and/or the media content, these topics may be merged into groups if they are related based on knowledge-base information to form topic hierarchy, and a set of media can then be selected into a group or a playlist for each topic or topic group based on the relevancy between a medium and the topic(s). A title can be intelligently suggested for each group, and the playlists can be automatically split, merged, and updated by adding or removing digital content.

In another embodiment, a relevancy metric can be computed between two media based on their metadata, media content, and/or collaborative viewing history. A pool of media can be clustered into groups or playlists based on the relevancy metric.

In another embodiment, a relevancy metric can be computed between two content creators based on a selection of features from their content. One or more content creators can then be selected as collaboration candidates for a content creator based on that relevancy metric.

In another embodiment, a method can be implemented that includes receiving a plurality of digital assets as inputs; extracting one or more representative features of each digital asset; for a group based on one or more representative features, using the one or more representative features of each digital asset to calculate a relevancy score between each digital asset and the group; and using each relevancy score to determine whether each digital asset should be assigned to the group.

In yet another embodiment, a method can be implemented that includes receiving an identifier of a content creator; receiving identifiers of potential collaborators; extracting one or more representative content-creator features for the content creator; extracting one or more potential collaborator features for a potential collaborator; using the one or more representative content-creator features of the content creator and the one or more potential collaborator features to calculate one or more relevancy scores; and using the one or more relevancy scores to determine whether the potential collaborator should be assigned to a group of relevant potential collaborators for the content creator.

In still another embodiment, a method can be implemented that includes receiving a plurality of digital assets as inputs; extracting one or more representative features of each digital asset; using the one or more representative features of a first digital asset and the one or more representative features of a second digital asset to calculate a relevancy score between the first and second digital assets; and using a clustering algorithm to form digital asset groups.

Further embodiments will be apparent from the specification and figures.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
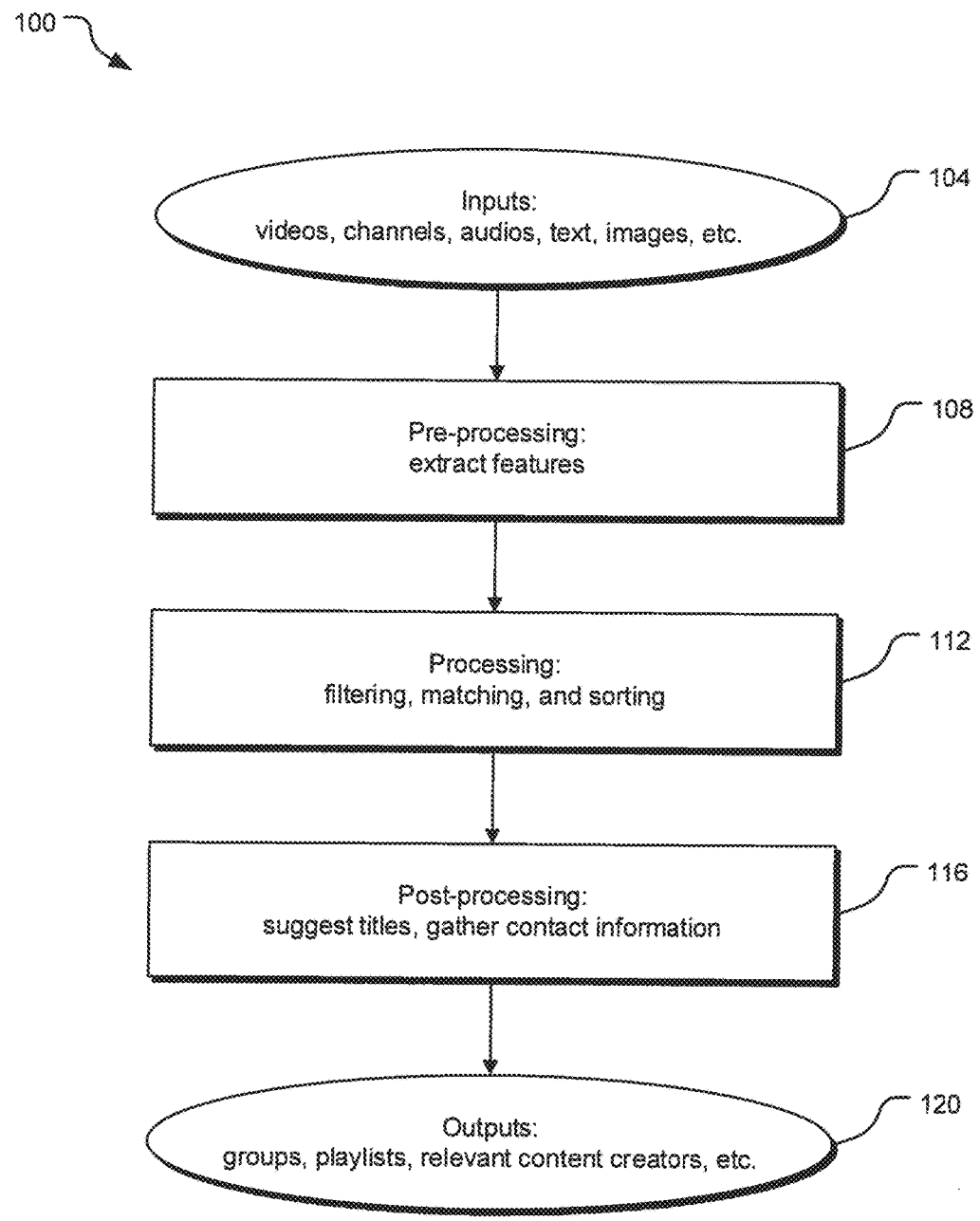
FIG. 1 is a basic diagram describing an example of workflow for grouping, playlist, and collaboration recommendation tools in accordance with one embodiment.

Digital content sharing websites such as YouTube.com™ provide a large amount of content that is viewable by the public and facilitate user searches for content and groups of content (e.g., playlists). Digital-content groups that are intelligently created, can increase the content's visibility in searches and extend the viewing sessions by keeping the viewers interested in the same topic that they are looking for rather than constantly looking for content. Having digital-content groups also makes it convenient to offer performance analysis based on topics, which helps trends and insights discovery. High-traffic digital content sharing websites build and maintain user-searchable groups or playlists and may add much additional digital content every day.

Therefore, one issue that content managers face is how to quickly generate meaningful groups or playlists and update the existing groups or playlists after each addition or removal (delete or make it not viewable to the public) of digital content. Another issue is to ensure that the groups or playlists will be created based on interesting topics and be of reasonable sizes to keep the audience engaged and motivated to watch more.

Content creators can also be grouped and connected through various forms of collaboration and cross promotion in order to attract new audience and increase viewership. However, a big issue for content creators is how to effectively find other content creators with similar or complementary interest, content, and/or audience.

To increase content visibility in searches and increase views and earnings, online digital content creators or content managers of high-traffic content-sharing websites seek to quickly and efficiently generate groups of content or playlists (i.e., sorted groups) from usually a very large pool of digital content. At the same time, they need to dynamically maintain these groups or playlists when content is frequently added, updated, or deleted. Very often, it is important that the digital content in a group is highly relevant and represents the pool of content in a meaningful way. However, automated grouping processes do not always guarantee that the content selected into a group will be related or of superior quality. Indeed, some online content distribution systems merely generate playlists based on the uploading time of day (e.g., recent uploaded content) or based on all-time views (e.g., most popular content). Such non-intelligent methods for grouping digital content cannot guarantee that viewers will be engaged in the content as there is no elemental relationship between the grouped videos other than the time of day that the videos were uploaded or the historical popularity of the content. Moreover, it can be very costly and time-consuming to require content providers or content managers to manually select, update, and/or sort the content in the groups or playlists. This is especially the case when there is a large volume of content to deal with every day and the content managers are not very familiar with all the content details. Therefore, in accordance with one embodiment, a tool may be utilized to generate and maintain meaningful content groups or playlists.

In one embodiment, an automated content-grouping or playlist-creation tool intelligently identifies common topics for a pool of digital content that belong to one or more content distribution channels. For each topic, a group of content is selected based on some relevancy metrics between the content and the topic. For the playlist application, the selected content might be sorted based on its relevance to the topic and/or the content popularity, with the aim of obtaining a high viewer engagement. To further optimize user experience, groups or playlists are preferred to have reasonable sizes, which can be obtained automatically by either trimming large lists, splitting large lists into subgroups, or merging small related lists into larger ones. For instance, splitting a large playlist of "Minecraft" gaming videos into a few smaller playlists based on the game mode and season makes each playlist shorter and less general. Trimming a ten-hour playlist into a two-hour one helps manage viewers' attention and avoid having them overwhelmed. As another example, merging small playlists scattered on Christmas, New Year, and Easter produces a holiday-themed playlist that contains content of a reasonable size.

In accordance with another embodiment, potential collaborators can be selected and recommended to a content creator or distribution channel. Content creators are usually keen on collaborating with their peers in order to attract a larger audience and increase the viewership of their videos. Finding the right creators or distribution channels to collaborate with is extremely challenging and time consuming, as there are often thousands and even millions of content creators available on a content sharing website. In addition, each content creator offers different content, audience demographics, and levels of popularity (e.g., number of views, number of subscribers). Currently, content creators heavily rely on personal experience, word of mouth, and feedback from their own fan base. However, these manual approaches are time consuming and ineffective. It is nearly impossible to manually find the best matches in a large pool of candidates without luck. Therefore, an automatic and efficient collaborator recommender is beneficial to help establish connections and collaborations among content creators.

In accordance with one embodiment, collaborating content creators are considered to be a good match if they meet one or more of the following criteria:

Have similar or complementary topics for their content
Have audiences that have similar characteristics (such as gender and age) and/or tastes
Use the same language(s)
Have similar popularity (views, subscriptions, engagement, number of multimedia assets, etc.)
Are close in geographic location
Have complementary skills or tools One can reach out to those content creators that cover similar or complementary topics, or attract audiences that have similar characteristics and tastes. For instance, two gaming content creators featuring the same game with similar popularity may mutually benefit from cross-promotion and are likely to grow their viewers together. A content creator with digital content related to crafts may successfully collaborate with a home cooking content creator, as both creators have similar audiences. In the latter case, having similar demographics is a good reason for the collaboration, because the majority of viewers of both creators are middle-age females. This type of less obvious prospective collaboration relationship needs an intelligent recommendation engine to be effectively detected. A successful collaboration quite often depends on having similar popularity for the collaborating content creators. A content creator would like to collaborate with high influential content creators, while big influencers might not be motivated enough to help out smaller content creators as they receive very little audience growth in return. As a result, content owners with the same level of popularity (often measured by monthly views or number of subscribers) are more likely to mutually agree for collaboration.

This disclosure presents relevancy metrics at several levels, including but not limited to: among digital media (applications include adding annotations to link relevant content, and creating content groups and playlists), among content creators (find collaborators), among content and a group of content (add new content to existing groups or playlists), and among groups of content (separate or merge groups or playlists).

FIG. 1 demonstrates the workflow 100 of some of the related applications, e.g., content grouping, playlist generation, and content creator collaboration in accordance with one embodiment. The inputs are received as shown in block 104 include but are not limited to videos, images, audio, photo albums, video channels, articles, books, web pages, social network profiles, blog posts, online merchandise items, or advertisement posts. Unless specified otherwise, videos and video channels herein as examples in the rest of this disclosure. In accordance with one embodiment, features are extracted from the inputs as shown by block 108, fed into filters as shown by block 112 and the relevancy metrics for measuring similarities are then calculated. The selected entities are then sorted based on the similarity measurement. Next, other relevant information such as titles is gathered, as shown by block 116. Finally, content groups, playlists, and relevant content creators are presented as outputs as shown by block 120, in accordance with one embodiment.

Content Grouping and Playlist Generation System

Figure 2:
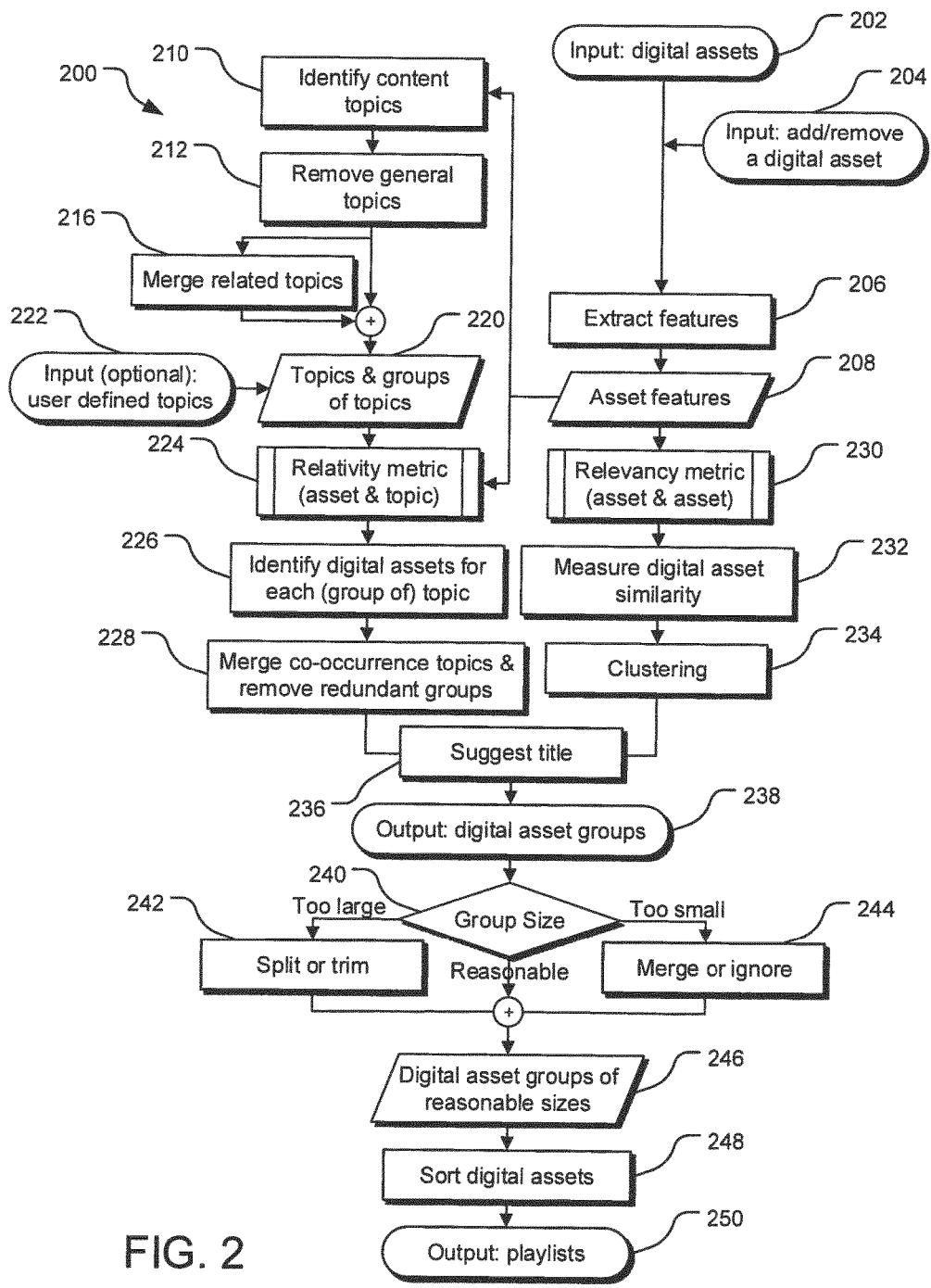
FIG. 2 is a flow chart illustrating a method of processing input videos to generate meaningful video groups/playlists, in accordance with one embodiment.

FIG. 2 illustrates an implementation for generating meaningful content groups or playlists. The "content" can be, for example, videos, images, audio, music, or text. Videos are used as an example herein. The input videos are processed to extract important features, which will be used to identify interesting topics and/or to measure content similarity. Then, relevancy metrics can be used to either classify videos under various topics or compute similarity scores for grouping videos using a clustering algorithm. For each video group, a title, keywords, or a summary might also be suggested. In one embodiment, content groups could be further processed by adjusting the group sizes and sorting content to generate playlists. Video groups or playlists are the outputs of the system. Furthermore, if a video is deleted from the group of input videos, that video is removed from the associated groups or playlists in accordance with this example. If a new video is added to the input videos, it could be added to relevant topics using the pre-defined relevancy metric. Depending on the algorithm used, the clustering process may or may not be re-computed for deleting or adding new videos.

In accordance with the embodiment shown in the flow chart 200 of FIG. 2, an example of the process can be illustrated. In operation block 202, one or more digital assets are received as inputs. In operation block 204, selected digital asset(s) can be added or removed. In operation block 206, one or more features of a particular digital asset can be extracted. The extracted features can be stored in a database and used as inputs to further operations as shown in operation block 208.

In operation block 210, the extracted features are used to identify content topics for a particular digital asset. Any general topics that are too generic to be useful to a user can be discarded, as shown by operation block 212. If topics are closely related, they can be merged into a single topic, as shown by operation block 216. A user can also supply user-defined topics; this is shown by operation block 222.

In operation block 220, topics and groups of topics are stored in a database and associated with an identifier for the particular digital asset under analysis.

In operation 224, relevancy metrics can be computed so as to assess how closely related a particular asset is to a particular topic. This computation can be performed for each topic that an asset is remotely related to or for a subset of the topics.

Operation block 226 shows that digital assets can be identified for each topic so as to form a group of assets for that particular topic. If there is a co-occurrence of topics or redundant groups, operation block 228 allows groups to be merged.

Operation block 232 illustrates that digital asset similarity can also be measured. Based on the digital asset similarity, assets can be clustered, as shown in operation block 234.

Based on the groups of digital assets and the clustering operation, operation block 236 can suggest titles for a group of assets. The group of digital assets can then be output, as shown by operation block 238. The size of the group can be tailored to a desired size. Operation block 240 shows that an assessment is made as to whether the number of digital assets in the group is too large, too small, or reasonable. If the size of the group of digital assets is too large, operation block 242 can split the group or trim out selected assets. If the size of the group is too small, operation block 244 can merge the group with another group of assets or ignore the small size determination.

Block 246 illustrates that groups of digital assets of reasonable size have been determined. The digital assets can then be sorted, as shown in operation block 248 and output as playlists as shown in operation block 250.

The following sections describe how one embodiment of a content grouping and playlist generation system works in more detail.

Input

Throughout this disclosure, videos are used as an example for the grouping and playlist applications. The technique, however, can be applied to many other entities, which include but are not limited to: images, audio, photo albums, books, web pages, blog posts, online merchandise items, or advertisement posts. Use of the term video is intended to include a URL of a unique webpage that contains a video file in addition to its metadata. For example, the URL https://www.youtube.com/watch?v=9bZkp7q19f0 contains a video entitled "PSY—GANGNAM STYLE (강남스타일) M/V" from the "officialpsy" YouTube channel. More information regarding that video, such as video description, number of views, likes and dislikes can also be found at the above mentioned link.

Extract Digital Content Features

One of the most efficient ways to summarize information about digital content is by extracting some representative features from it. One or more features can be used in designing the relevancy metrics in different applications.

Metadata

Video descriptive metadata such as the title, description, transcript, and keywords, is particularly useful in providing a summary of the video content. These are useful features for humans or computers to quickly understand video content without watching it. The metadata may be manually created by content creators or generated through automated information processing algorithms. A pre-processing step, such as removing stop words from the text, is often used before extracting meaningful features.

Structural metadata such as the video length, resolution, aspect ratio, frame rate, and bit rate may help distinguish the video statistics and quality. For instance, certain viewers with high speed Internet connection may choose to watch only high-definition (HD) videos, which justifies grouping videos by resolution. The structural metadata are usually stored and encoded in the header of a digital asset file. They can also be available through APIs, such as YouTube Data API.

Content Category for Video

The video content category is another useful feature for measuring video relevance. In most online video sharing systems, each video has a category. Examples of the categories include but are not limited to:

Cars & vehicles
Comedy
Education
Entertainment
Film & animation
Gaming
How to & style
Music
News & politics
Non-profits & activism
People & blogs
Pets & animals Science & technology
Sport
Travel & events Visual and Audio Information Some visual and audio features can play an important role in understanding or identifying video content. Examples include but are not limited to color (e.g., skin color, scene color), lighting condition, texture, shape, real-world object (e.g., table, book), and scene (e.g., mountain terrain, lake scenery). The audio information includes but is not limited to speech, closed caption, music, audio genre, and audio volume.

Video analysis, such as object recognition and event detection, is usually computationally expensive. It is a common practice to choose some representative frames instead of processing all of the video frames. In one embodiment, the video is downsampled temporally and/or spatially in order to reduce the computational cost. In another embodiment useful frames (such as the intra-coded frames in a compressed video or the starting and ending points of any smooth animation transition) are selected from relevant shots of a video to reflect the video content. The importance of a shot can be determined by the length of the shot and/or the amount of visual and audio features in the shot.

Knowledge-Base Topic

A knowledge base is a technology used to store complex structured and unstructured information used by a computer system. Topics in a knowledge base, such as Wikipedia's Wikidata, may cover millions of real-world entities, such as people, places, and objects. Describing entities of interests (such as videos, video channels, websites, and merchandises) with knowledge-base topics is a great way of finding similarities and connections among these entities. Knowledge-base topics may be identified using metadata and video/audio content through signal processing and analysis. For example, if the word "puppy" is found in a video title or description, and/or if the object "puppy" is identified in video frames by an object recognition algorithm (such as greyscale matching, gradient matching, or deep learning), the knowledge-base topic "puppy" can be associated with this video. Some online video sharing systems, such as YouTube, automatically identify related knowledge-base topics for videos and video channels. In one embodiment, related knowledge-base topics are identified or extracted for each video. The statistics of these topics for some or all input videos are also computed. This is done by counting how many times each topic occurs in the input videos. The topic statistics $t_{content}=[t_1, t_2, \ldots, t_n]$, where $t_i$ (i=1, ..., n) is the count of the ith topic, help with identifying what topics the videos cover, and the occurrences of each topic. Videos could be naturally grouped based on knowledge-base topics.

Language

Language is another feature for finding relevant entities. If a viewer only understands the English language, there is no reason for suggesting German videos to them. The languages used in a video or a content distribution channel might be explicitly indicated as part of the metadata. In one embodiment, if the language is not specified, it can be detected by applying a language detection tool such as Google Translate to the texts in metadata (such as title, description, and closed captions), assuming that the languages used in the digital content are the same as that used in the texts. To identify the languages used by a content distribution channel, the texts could be collected from some or all of their videos. In another embodiment, some speech recognition algorithms may be used to identify the languages actually used in the video. The spoken words are first translated into text using either a speaker-independent or speaker-dependent (i.e., training) approach. Then, the language is detected using the translated text.

Relevancy Metrics

Throughout different applications, relevancy metrics can be used to measure the similarities between objects. In one embodiment, relevancy metrics are defined between video and topic, video and video, as well as video and video group. At least one of the following features is considered in each relevancy metric. If more than one feature is considered in a metric, the relevancy metric could be generated by combining the relevancy scores of each feature. In one embodiment, the relevancy scores of different features are combined using a weighted sum. In another embodiment, a machine learning algorithm is used to designate the combination of the scores. For example, a linear regression or neural network algorithm can be used when training and cross validation examples are available.

Basic Features

In one embodiment, for those features that have small number of discrete values acted as class distinguishers, such as content category, language, video aspect ratio, and frame rate, the relevancy score could be either simply defined as 0 when the values are different and 1 when the values are the same. In another embodiment, for text features such as title, description and tags, the relevancy score of two text strings could be calculated as the number of overlapping (shared) words/characters, normalized by the lengths of the strings, or extract semantic topics and measure topic distances. In yet another embodiment, for features with numerical values, such as video length, resolution and bit rate, the relevancy scores can be measured by calculating the difference between the two values, and normalizing the difference.

Visual Features

Visual-feature distance, such as Euclidean distance, measures the similarity between two videos/images or a video/image and a topic in various dimensions, such as color, object, and texture. For example, in one embodiment, a distance of 1 signifies an exact match with the query with respect to the dimensions that were considered. Values less than a pre-determined value (e.g., 1) indicate various degrees of similarities between the entities. The distance measurement could be calculated for one frame, a few frames (e.g., key frames or randomly selected frames), or all frames of a video.

Figure 3:
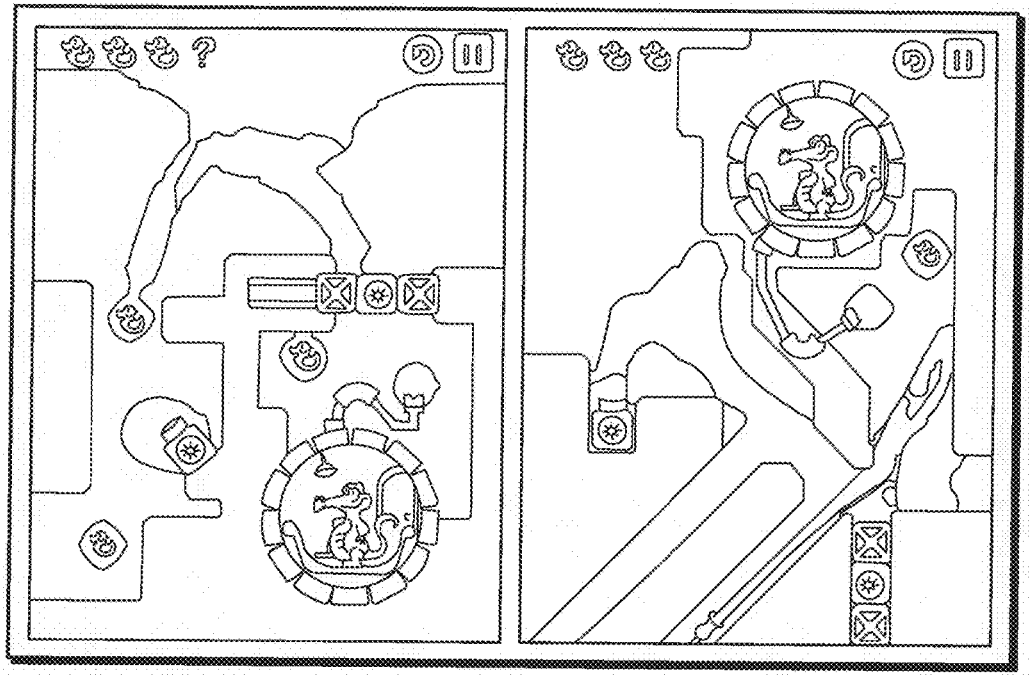
FIG. 3 illustrates two screenshots from "Where's My Water?" game, showing the color similarity and object similarity between typical screenshots of the game.

In an embodiment, a scene or video similarity is detected or measured through color matching. Some scenes have predetermined color patterns, such as the "Where's My Water?" video game from the Walt Disney Company. Most screenshots from this game have very similar color composition as shown in the two screenshots in FIG. 3. Although the locations of the color patches may vary, the color histograms have peaks at the same positions on the color spectrum. In one embodiment, a color-histogram comparison conducted in some color space (such as YCbCr, CIELAB, sRGB(Red Green Blue)) is used to measure the video similarity. In another embodiment, each frame is segmented into regions by color, and the spatial relationship among several color regions is compared between frames. The color matching approach does not depend on the image size or orientation. The matching could be done for a frame, a video, or a temporally and/or spatially downsampled video. It could be used for scene detection, and further links the content to the names of detected objects, as well as knowledge-base topics.

In another embodiment, an object-recognition technique may also work well for identifying the game "Where's My Water?" when the main character (a little alligator found in both pictures in FIG. 3) is used as the object of interest for image retrieval. In one embodiment, an appearance-based method, such as the gradient matching, is used to recognize objects, faces, scenes, logos, or text (such as level/episode, score, and time that are embedded in the video). In another embodiment, a feature-based method, such as the scale-invariant feature transform algorithm developed by David Lowe, is used to find feasible matches by comparing object features with image features.

Texture measures look for visual patterns and how they are spatially defined and can be a useful visual feature to measure content relevancy. In one embodiment, the texture of a video frame is identified by first computing the gradient of the brightness of the frame, then measuring some of the Tamura texture features (including contrast, regularity, coarseness, directionality, line-likeness, and roughness) using the gradient.

Audio Features

Music, speech, sound, and other audio features may help with finding similar content. Videos that feature the same song, the same instrument, the same or similar music genre, or similar conversation topic might be grouped together in one embodiment. In another embodiment, variations in tone and volume intensity may be a feature to consider when matching content. As an example of using audio features, the "Harlem shake" videos could be grouped by identifying the same music in all of the videos. In one embodiment, digital audio signal processing and classification techniques are used for identifying the audio features and hence measuring the video relevancy. For example, the discrete Fourier transform can be used to extract spectral features, and the minimum distance or a k-nearest neighbors algorithm, proposed by N. S. Altman in the paper "An introduction to kernel and nearest-neighbor nonparametric regression", can be used for audio classification.

Knowledge-Base Topic

The relevance between videos could be measured by the similarity of the knowledge-base topics that describe them. In one embodiment, an exact match is used to compare the topics of two videos, and the number of common topics is computed and normalized by the total number of topics the video has. For example, video A has topics "dog" and "Ichiro Suzuki", and video B has topics "puppy", "dog" and "cute". One common topic "dog" is identified, which is 50% of the size of the total number of topics (i.e., two) video A has. In another embodiment, the topics could be matched loosely, allowing close variants of the topics to be matched as well. A matching score is given based on the similarity of the matched topics. Close variants include but are not limited to singular and plural forms, acronyms, stemmings (such as "floor" and "flooring"), abbreviations, and accents. Furthermore, using the links/relationships among knowledge-base topics, a hierarchy representation of topics can be derived, which can be used in the relevancy measurement. An example is that topic "Christmas" can be a subset of "Western holiday" topic, which again can be a subset of "holiday" topic.

Collaborative Filtering: Based on Viewers Viewing History and Feedback

As opposed to the metadata and content matching, users' search and viewing history may help assess the similarities between items without the need of understanding the items themselves. In one embodiment, video groups and playlists could be created by finding which videos people tend to watch together based on the analysis of the viewing history of a large group of people. Videos watched, liked, or shared by the same group of viewers generally have high similarities.

Playlists may also be customized for each individual viewer based on their previous viewing interests. The viewing records of other viewers of similar tastes may provide a good indication of what a current viewer would like to see but has not watched yet.

In another embodiment, the collaborative filtering technique may be combined with the content-based matching technique to obtain more promising results. This may be done by first finding the viewers' watching habits and discovering their other interests, then finding channels that match these interests.

The relevancy metrics may be gradually refined by users' feedback. For example, playlists consist of highly relevant videos based on a relevancy metric may be evaluated and modified based on viewer's feedback (reflected by metrics including but not limited to likes and dislikes, skip rates, watch time, comments, etc.). Modified relevancy metrics and better groups/playlists can be generated.

Creating Groups

In one embodiment, topics are identified and processed for the input videos. These videos are then grouped for each selected topic. One video could belong to more than one group. In another embodiment, similarities between any two videos are measured by a relevancy metric, and the videos are clustered based on the metric.

Topic Identification and Processing: Relevancy Between Digital Content & Topic

Based on at least one of the extracted digital content features introduced above, topics covered by the input digital content can be identified using statistical analysis, natural language processing, or digital signal processing techniques. If some topics are very general and not useful for the purposes of content curation, they should be removed. An example of these general topics is "video". Any topic that is related to a large portion (as an example, 95%) of the input digital content may also be removed such as "HD". Next, the topics could be merged into groups if they are considered to be a subset of a more general topic. For instance, the topics "Tangled", "Rango", and "Toy Story" may be merged into a more general "Animation" group, which provides insights for content under broader topics. The linkage among topics can be manually defined. Alternatively, they may be found based on some knowledge-base connectivity. The latter approach is more scalable and provides easier updating mechanism for topic merging.

Grouping Based on User Defined Keywords

Finding relevant videos based on user-defined keywords could provide customized video groups for the particular user. This is beneficial especially when the keywords are not a common entity, such as the user-created word "BroCraft". A keyword-based matching scheme may still use the information (such as the knowledge-base topics, video titles, descriptions) and approaches (e.g., string matching and object recognition) that were previously discussed to conduct the search. Either exact string matching or approximate string matching can be used when the keywords are searched in metadata. The latter approach may be able to find matches even with some misspellings or alternative spellings.

In one embodiment, for each topic, or user-defined keyword, or merged topic group, videos are collected based on the relevancy metric between a video and a topic or a topic group. The relevancy scores can then be sorted based on the distance to the topic or a group of topics. A threshold of relevancy score could be used to determine whether a topic should belong to a group of a certain topic. The threshold could be pre-defined for all kinds of inputs. In an alternative embodiment, the threshold is adaptively defined based on the score distribution (such as score histogram) for each particular group of inputs. Then, the co-occurrence groups are removed or merged in order to eliminate or reduce the group redundancy. For example, assuming that "FIFA" and "FIFA 14" are both identified as topics, and the relevant videos to both topics are the same group of videos. Merging the two topics into "FIFA & FIFA 14" and suggesting only one video group eliminate the unnecessary attention to two identical groups. Each finalized group is naturally associated with a topic or a topic group, which can be used as a source to suggest descriptive titles, keywords, or summary for the group.

Clustering: Relevancy Between Video & Video

Clustering is the task of grouping a set of objects in such a way that objects in the same group are more similar (in one sense or another) to each other than to those in other groups. In one embodiment, a clustering algorithm such as hierarchical clustering or k-means clustering, which was first proposed by Stuart Lloyd in 1957 and published in 1982 in a paper entitled "Least squares quantization in PCM" in IEEE Transactions on Information Theory, is used to group the input videos based on the relevancy metric. The relevancy metric measures the similarity between two videos or between a video and a group of videos. Different types of clustering algorithms may be used for different relevancy metrics. In one embodiment, a hierarchical clustering algorithm, that builds a hierarchy of clusters using either a "bottom-up" or "top down" approach, is used to generate non-overlapping groups. A linkage criterion, such as single-linkage clustering, complete linkage clustering or average linkage clustering may be used for the hierarchical approach. In another embodiment, a fuzzy clustering could be used to generate overlapping groups. The output groups of a clustering algorithm are usually associated with some distinct feature values that may be used to indicate the reason why the group is different from the others, which can be used for suggesting titles if needed. In addition, the video titles, keywords, topics, and description associated with the group may contribute to the title or summary of the group. In one embodiment, frequently-used words extracted from at least one of the above features are chosen for creating the title.

Create Playlists Based on Groups

A playlist is a special type of video groups. First, the size of playlists is limited, as practically, viewers have only limited time and interest in watching videos on the same topic in a row. Furthermore, the order of the videos matters in a playlist.

Group Size Adjustment: Splitting or Merging

Viewers are typically interested in watching content on one topic for a reasonable amount of time. Some online video distribution platforms have an upper and a lower limit for the size of a playlist. Based on user experience studies, an optimal playlist size (in terms of the number of videos, the length of all videos, the associated topics, etc.) can be determined.

If there are too many digital assets in a group, in one embodiment the most relevant assets are kept in the playlist and the least relevant ones are removed. The relevancy of digital content to a group can be determined by where (e.g., title, description, knowledge-base topic, media content) and how many times the group topic or keyword is identified. In another embodiment, large playlists are split into subgroups, so that each subgroup covers a sub-topic and maintains reasonable size. The sub-topics could be identified based on one or more digital content features introduced in Section 0. Alternatively, a clustering algorithm could be used to split a large group based on a relevancy metric.

Very small playlists, on the other hand, could be deleted or further grouped into larger playlists that cover broader topics, which could be derived by semantically discovering the topic linkages within a knowledge base.

Digital Content Sorting

When a playlist is presented to the audience, the digital assets in it are often preferred to be placed in a certain order. In accordance with one embodiment, videos with high relevancy to the playlist topic should have a higher ranking than videos with low relevancy. Videos of high quality and/or with interesting content have better potential to be liked by new viewers than videos of low quality or with uninteresting content. Video resolution, sharpness, level of compression, composition can be features for measuring video quality, while the number of accumulated hours a video has been watched is one parameter for measuring if a video is interesting. To achieve high viewer retention, in one embodiment, videos of high quality and/or with interesting content have a higher ranking than videos of low quality. This sorting approach is effective if a playlist is primarily displayed starting from the first video. In an alternate embodiment, high quality and low quality videos are altered. This shuffled option is especially useful if a playlist can be watched from anywhere in the list. In another alternate embodiment, videos are sorted by chronological or reverse chronological order. This is meaningful for videos that are associated with episodes or levels, such as game sequences or TV shows. Levels or episodes may be extracted from the video titles, thumbnails, or sometimes from the video content via video analysis solutions.

In accordance with one embodiment, a list of videos is sorted using either relevancy metric or quality metric, or both. A video with high score would have a higher ranking than a video with low score. The relevancy metric is computed as explained above. The quality metric can be computed using video statistics such as likes, dislikes, views, favorite added, favorite removed, watch time, watch percentage, viewer retention, or a combination of these statistics. In one embodiment, the product of watch time and like and dislike ratio is used as the quality metric.

Collaboration Recommendation System

Figure 4:
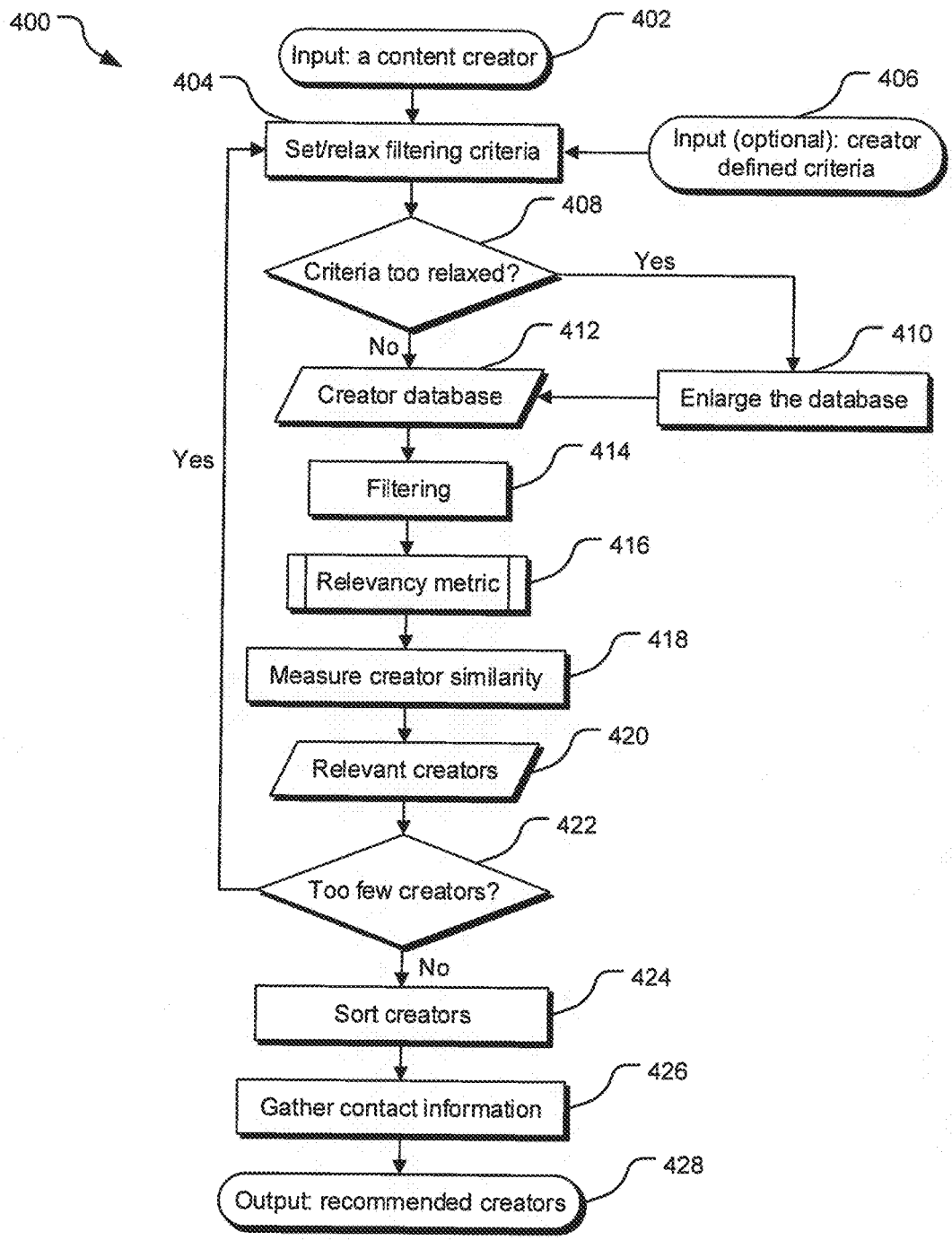
FIG. 4 is a flow chart illustrating a method of selecting relevant video channels for a given channel in order to setup effective collaborations, in accordance with one embodiment.

FIG. 4 illustrates an embodiment for suggesting relevant content creators for a given content creator. A filtering process may be applied to screen the potential content creators from a large creator database, hence reducing the computational cost for measuring creator similarities. The filtering criteria are set automatically based on the features of the input creator or manually/semi-automatically based on the user's choice of input. A relevancy metric is then used to compute similarity scores between the source creator and the filtered target creators from the database. The relevant creators are sorted and provided as recommendations.

In accordance with the embodiment shown in the flow chart 400 of FIG. 4, an example of the process can be illustrated. In operation block 402, the identity of a content creator is received as an input. Operation block 404 shows that filtering criteria can be set; the criteria can be made more stringent or relaxed in accordance with a particular situation. The content creator who is seeking a collaborator can input additional criteria for the filtering process, as shown in operation block 406.

In operation block 408, a check can be performed to determine whether the criteria are too relaxed. If the criteria are determined to be too relaxed, operation block 410 shows that the database can be enlarged. Ultimately, a database of possible collaborators is generated as shown by block 412.

In operation block 414, the filtering operation can be applied to the database of possible creators. For each creator output by the filtering operation, a relevancy metric can be calculated, in accordance with operation block 416. Based on the relevancy metrics, a further measurement can be made to see how similar a creator is to the content creator who is looking for collaborator(s), as shown in operation 418. In operation 420, a group of relevant creators can be compiled based on their similarity to the content creator who is looking for collaborator(s).

Operation block 422 illustrates that the group of relevant creators can be revised. For example, if the group includes too few collaborators, the filtering criteria can be revised and the process can be repeated.

Once the group of relevant creators is produced, as shown in operation 420, the group can be sorted, as shown by operation 424. Contact information for each of the relevant creators can be gathered, as shown by operation 426, and output as a group of recommended creators, as shown in operation 428.

The following sections describe how one embodiment of a collaboration recommendation system works in more detail.

Input

The main input of the collaboration recommendation system is a content creator and the related content channel. A channel identifier (ID) such as the channel name, URL, or the channel ID could be used. The channel ID is a unique identifier that is used to refer to a content distribution channel in certain apps and services. For example, on YouTube, a channel ID consists of a combination of letters and numbers, such as UCWJL0W9fg9qeUHP471uE0xg.

Moreover, in other embodiments, content creators may also specify their search criteria as the inputs for a customized search. These criteria may include but are not limited to:
- collaborators' number of subscribers
- collaborators' total number of views in a specific time period or on a specific topic
- languages of the channels
- content creators' location (continent, time zone, country, city, etc.)
- requirement on similar or complementary viewer demographics
- skills a creator may need help with for creating high quality videos, and skills collaborators can offer
- products, devices, or tools people would like to offer or exchange
- user specified keywords Extract Content-Creator Features Some features associated with content creators are similar to those of the media content features, such as metadata, content category for video, visual and audio information, knowledge-base topic, and language features, as explained above. Additional features more unique to content creators are described below.

Content-Creator Statistics

Content-creator statistics is a feature for measuring creator similarity. It could also be used for screening creators in the database during the filtering process. The creator statistics may consist of a number of metrics including but not limited to the number of subscribers, the number of views in a specific time period, whether the channel would like to participate in collaboration, the content creator's location, viewers' geographical distribution, the skills/tools needed and skills/tools that are being offered, the number of digital assets belonging to the channel, digital content upload frequency, distribution channel start date, and the most recent date that the channel updated a digital content.

Content Category for a Channel

The channel category is a useful feature for measuring content relevance. A channel usually has digital content from different categories. In one embodiment, the categories of a channel are represented by the statistics of the categories of a subset of digital content or all content in the channel. The subset of content could be selected randomly, from the most recent uploaded content (which represents the recent interest of the content creator), or from the most popular content (which represent viewers' interest of the channel), etc.

In one embodiment, the content-category statistics for a channel are computed as follows. It is assumed that there are k categories on a particular content sharing platform. First, the number of digital content $c_i$ that belong to the ith category is retrieved. The vector of numbers $c=[c_1, c_2, \ldots, c_k]$ is then normalized using:

$$N(c) = \frac{c}{\|c\|_1}, \qquad (1)$$

where the $L_1$ norm is defined as $$\|c\|_1 = \sum_{i=1}^{k} |c_i|.$$

In alternative embodiments, other norms (such as $L_2$ norm, p-norm, and infinity norm) may be used in the normalization process.

To reduce the computational complexity when measuring the content category similarity, one may consider only the important categories for a content distribution channel. In one embodiment, only categories that are comprised of more than $\tau$ % of all content of interest are considered in the content category of the channel. In other words, the values less than $\tau$ % are set to zero in vector $N(c)$ in equation (1), where $\tau$ can be any non-negative number between 0 and 100.

Knowledge-Base Topic

Knowledge-base topics are useful terms for describing digital content and content creator's interest. Topics related to a content creator's work may be identifiable directly through their distribution channel using methods similar to those applied to digital content. In an alternative embodiment, topics related to a content creator's work are collected by gathering all topics related to individual content from the creator. In the third embodiment, the topics related to a content creator's work are defined using a hybrid approach, where topics for both the distribution channel and individual content are considered. This is especially applicable when limited topics from individual content are available, which makes the individual topic statistics prone to noise. In one embodiment, one may use the hybrid approach if the total count of topics from individual content is less than a threshold $\tau$, i.e., $\|t_{content}\|_1 \leq \tau$, where $t_{content}$ is noted above. Channel topics can further be noted as:

$$t_{channel} = [i_1, i_2, \ldots, i_n], \qquad (2)$$

-continued $$\text{where}\begin{cases} L_1 = 1, & \text{if the } ith \text{ topic is one of the channel topics} \\ L_1 = 0, & \text{otherwise} \end{cases}$$

Then, the normalized topic statistics $N(t_{content})$ and the normalized channel topics $N(t_{channel})$ are computed, where the normalization function is defined in equation (1). In the end, the two normalized vectors are added, i.e., $N(t_{content})+N(t_{channel})$, as the hybrid topics to describe the content creator's work.

Viewer Demographics

Viewer demographics can characterize digital content by viewer's age, gender, location, etc. For example, some online video sharing systems divide viewers into a number of age groups (e.g., 13-17, 18-24, 25-34, 35-44, 45-54, 55-64, 65 and above). Each group is further divided into male and female subgroups, resulting in 14 demographics groups in the example above. The percentage of viewers in each group might be acquired from the online video sharing system, and used for demographics matching among content distribution channels. The term $d=[d_1, d_2, \ldots, d_m]$ is used to represent the viewer demographics, herein, where $d_i$ is the percentage of viewers in the ith demographics group and m is the total number of groups.

Filtering and Criteria Setting

Filters may be used as a pre-processing step in order to provide customized search results as well as to reduce the number of candidate collaborators hence the computational cost for similarity measurement. These filters can be implemented in no particular order. They can include:

Participation

The participation status of a channel indicates whether the content creator is willing to participate in the collaboration. The recommendation can be made only for creators who would like to collaborate.

Content Distribution Channel Statistics

A successful collaboration depends on the relevance of the collaborating content distribution channels. The channel size, popularity, and activity level are important measurements of channel relevance. The channel size and popularity could be reflected by the number of subscribers, the number of views or most recent views (such as views in the last 30 days), and the number of digital assets in a channel. The activity level of a channel could be measured by how frequently new content is uploaded, how frequently comments are replied, etc. The creator seeking collaboration (i.e., sender) could set restrictions on the size, popularity, and/or the activity level of the targeted channel (i.e., receiver). The receiver could also set constraints to block undesirable senders. In one embodiment, content-creator defined constraints are collected. In another embodiment, the constraints are derived from the statistics of creators' channels. For instance, the sender channel has s subscribers, and v views in the last 30 days. The automatically suggested search ranges could be $$\left|\frac{1}{\alpha}s, \alpha s\right|$$

and $$\left|\frac{1}{\beta}v, \beta v\right|,$$

where constants $\alpha > 1$ and $\beta > 1$. The values of $\alpha$ and $\beta$ may vary based on the size of the collaborator pool and the popularity of the sender's content category and topics within the pool. For instance, for gamer-dominated collaborator pool, the variables $\alpha$ and $\beta$ could be smaller for a gamer sender than a non-gamer sender.

Figure 5:
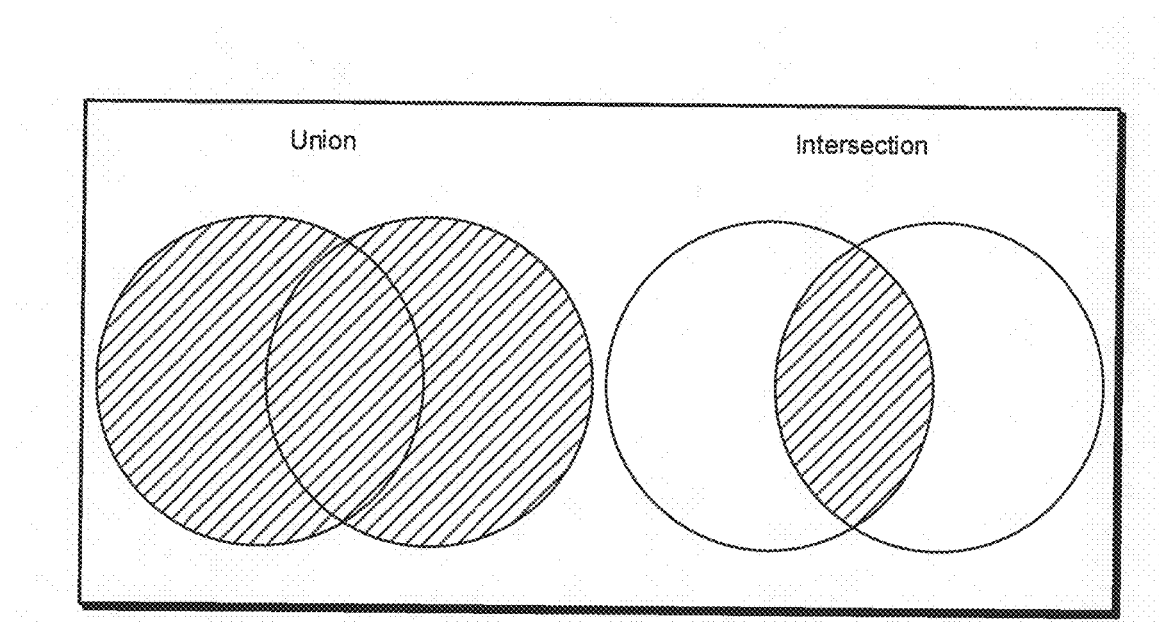
FIG. 5 demonstrates the union and intersection concepts of two sets.

The sender-side constraints and receiver-side constraints can be defined in the same fashion. Filters can be applied to reflect both sender-side constraints and receiver-side constraints. Herein, the union of two sets is noted to be the set of elements which are in either set. The intersection of two sets is the set of elements that are in both sets, as illustrated in FIG. 5. In one embodiment, the results from different sender-side filters are combined using union expression. Alternatively, the intersect operation could be used based on the sender's preference. The same rule applies to the results from the receiver-side filters. Then, the final results of the channel statistics filters are obtained as the intersection of the sender and receiver filter results.

Language and Location

Using the same language is often a basic requirement for a successful collaboration between content creators. Sometimes, in-person collaborations require the collaborators to be in the same city, the same country, or the same time zone. Therefore, in one embodiment, the language used in a channel and/or the content creator's geographical location are considered as creator filters.

Skill and Product Swap

Some content creators may need help with certain skills or products in order to produce high quality content, while others might be experts on these skills or the owners of these products. The skill and product swap among content creators could be additional or independent filters. In one embodiment, a popular set of skills that some content creators need help with while other content creators may have or be good at is used as a filter. The skills include but are not limited to:

Provide Original Music
Provide Original Sounds
Voiceover
Graphic Design
Video and Audio Editing
Camera Help
Extra Crew
Acting/Hosting
Special/Visual Effects
Animation
Writing
Mentoring
Producing
Directing In another embodiment, a list of most popular products which some content creators lack while other content creators are willing to lend, trade, or sell is used as a filter. These products include but are not limited to:

Games
Consoles
Software
Hardware
Gadgets
Filming Equipment (Camera, Lighting, etc.)
Online Store Credits (Apple, Amazon, etc.)

Relevancy Metric

In accordance with one embodiment, a relevancy metric between two content creators is defined by considering at least one of the following features. If more than one feature is considered in this metric, the relevancy metric can be generated by combining the relevancy scores of each feature. In one embodiment, the relevancy scores of different features are combined using a weighted sum. In another embodiment, a machine learning algorithm such as Naïve Bayesian or a decision tree classifier can be used to design the fusing formula.

Content Category

Identifying whether two creators cover some common content category can be used to assess content creator similarities. A gaming content creator is more likely to collaborate with other gaming content creators, since the viewers of the content are all interested in the same content category, i.e., gaming.

In one embodiment, the matching scheme is to determine whether there is any common content category between two content creators. Thresholds may be set for the minimum percentage of the common category based on all the content of the creators. The output is a list of creators that produce at least one common category of content with the creator requesting collaboration.

In an alternative embodiment, the category-similarity score of two creators is computed by evaluating the sum of the product for the normalized category statistics (x and y) of two creators of interest. The category-similarity score is computed as follows:

$$\int (x, y) = \sum_{i=1}^{k} x_i y_i. \quad (3)$$

Another alternative embodiment is to match two content creators by how well their content categories and their associated probabilities are correlated, which can be measured using metrics such as the Pearson product-moment correlation coefficient. The content-category correlation coefficient contributes to the creator similarity score, which indicates how similar two content creators are.

The Pearson product-moment correlation coefficient is computed as follows:

$$r_{ry} = \frac{\sum_{i=1}^{k}(x_i - \bar{x})(y_1 - \bar{y})}{\sqrt{\sum_{i=1}^{k}(x_i - \bar{x})^2 \sum_{i=1}^{k}(y_i - \bar{y})^2}} \quad (4)$$

where category statistics x and y are vectors of size k×1, and $\bar{x}$ and $\bar{y}$ are the means of the vectors x and y, respectively. The value of correlation coefficient is between −1 and 1, with 1 being total positive correlation, 0 being no correlation, and −1 being total negative correlation.

To illustrate the content-category similarity metrics, the category statistics are presented for five content creators in Table 1, where Creator A is the sender and Creators B to E are the receivers. Table 2 shows the similarity comparison among the similarity metrics in the three embodiments for matching Creator A with the other four creators. Based on the user's preference, a proper similarity metric can be selected.

TABLE 1

Examples of content-category statistics

| Category Statistics | gaming | music | people & blogs | education |
|---|---|---|---|---|
| Creator A | 0.5 | 0.3 | 0.2 | 0 |
| Creator B | 0 | 0.6 | 0 | 0.4 |
| Creator C | 0.8 | 0.1 | 0 | 0.1 |
| Creator D | 0.5 | 0.3 | 0.2 | 0 |
| Creator E | 0 | 0 | 0 | 1.0 |

TABLE 2

Comparison of content-category similarity metrics

| Similarity | Metric 1 boolean | Metric 2 sum of product | Metric 3 correlation coefficient |
|---|---|---|---|
| A vs B | 1 | 0.18 | −0.3736 |
| A vs C | 1 | 0.43 | 0.7796 |
| A vs D | 1 | 0.38 | 1 |
| A vs E | 0 | 0 | −0.8006 |

Figure 6:
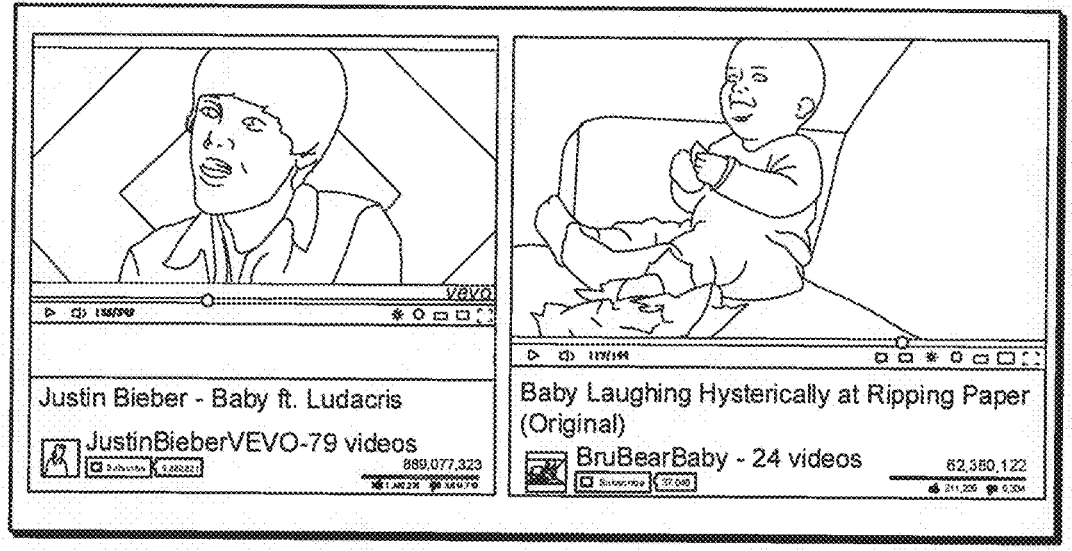
FIG. 6 shows an example of two creators' content having different categories but the same knowledge-base topic.

Content-category matching is necessary, especially when the associated knowledge-base topics may refer to different things. For instance, two creators featuring totally different content may have the same associated knowledge-base topic. In FIG. 6, the topic "baby" in the first creator's content refers to the name of a popular song, and the "baby" in the second creator's content refers to an infant. Without the category matching, the two creators could be considered producing similar content.

Knowledge-Base Topic

Since not all knowledge-base topics are of the same importance for measuring the creator relevance, different weights w can be assigned to the topics based on their generality in accordance with one embodiment. The weights w can be considered as a way to normalize topic features. The relevancy score of content topics reflects the creator similarity. To define the relevancy metrics, in one embodiment, the sum of product is used. Suppose the topic statistics for two creators' channels are represented with vectors x and y, where $x_i$ and $y_i$ correspond to the same topic. The associated weight vector w indicates the generalities of the corresponding topics. The sum of product similarity metric is computed as follows:

$$\int (x, y, w) = \sum_{i=1}^{k} w_1 x_i y_i. \quad (5)$$

In another embodiment, the weighed correlation coefficients are used to measure the topic similarity. Instead of using the correlation coefficients defined in equation (4), a weighted correlation is used due to the fact that topics have different weights based on their generalities. Matching on a specific topic carries more weight than matching on a general topic when identifying creator similarities. Below is how a weighted correlation is computed.

To calculate the correlation between vectors x and y with the weight vector w (all of length n), the weighted mean can be defined as follows:

$$w(x, w) = \frac{\sum_{i=1}^{n} w_i x_i}{\sum_{i=1}^{n} w_1} \quad (6)$$

Then, the weighted covariance is computed as:

$$\text{cov}(x, y, w) = \frac{\sum_{i=1}^{n} w_i (x_i - m(x, w))(y_i - m(y, w))}{\sum_{i=1}^{n} w_1} \quad (7)$$

Finally, the weighted correlation coefficient can be computed as follows:

$$\text{cov}(x, y, w) = \frac{\text{cov}(x, y, w)}{\sqrt{\text{cov}(x, x, w)\text{cov}(y, y, w)}} \quad (8)$$

Similar to the correlation coefficient, the weighted correlation coefficient also has a value between −1 and 1, with 1 being total positive correlation, 0 being no correlation, and −1 being total negative correlation. A larger coefficient indicates a higher topic similarity between the content of two creators.

Viewer Demographics

Viewer demographics help the collaborators to expand audiences in a particular country or continent. Having similar or complementary demographics is a good indicator of audiences having the same interests. For instance, two creators (e.g., a child-education content creator and a cooking content creator) with the majority viewers being middle-aged female, are very likely to have a successful collaboration, as their viewers have similar interests and tastes. In one implementation, the correlation coefficient of the audience demographics (which are vectors, as noted above) is used as the similarity metric. Creators with the correlation coefficient close to 1 have similar demographics, while creators with the correlation coefficient close to −1 have complementary demographics.

Collaborative Filtering

Collaborators could be recommended using collaborative filtering by collecting and analyzing interests, preferences, or taste information from a large amount of viewers. It is useful to identify the creators whose content is watched, liked, and disliked by, and who their most influential subscribers are. A creator's collaboration history may also be used as a factor for collaboration recommendation. For example, content creators could be evaluated by the number of rejected and accepted requests, collaborator feedbacks, and recommendations. In one embodiment, a rating is provided based on the creator's previous collaboration history, and is considered in the future recommendation to encourage fair and effective collaboration. Various collaborative filtering techniques could be applied in the same fashion as discussed above.

Sort and Gather Contact Information

A list of collaborators can be sorted using the relevancy scores. A creator with high relevance would have a higher ranking than a creator with low relevance, for example.

Then, the contact information or profile pages for the suggested list of collaborators are collected. Contact information could be names, emails, social media information such as LinkedIn profiles, Facebook pages, Skype accounts, personal messages, etc. Profile pages may include the content statistics of a creator and their messages to potential collaborators, etc.

Implementation

Figure 7:
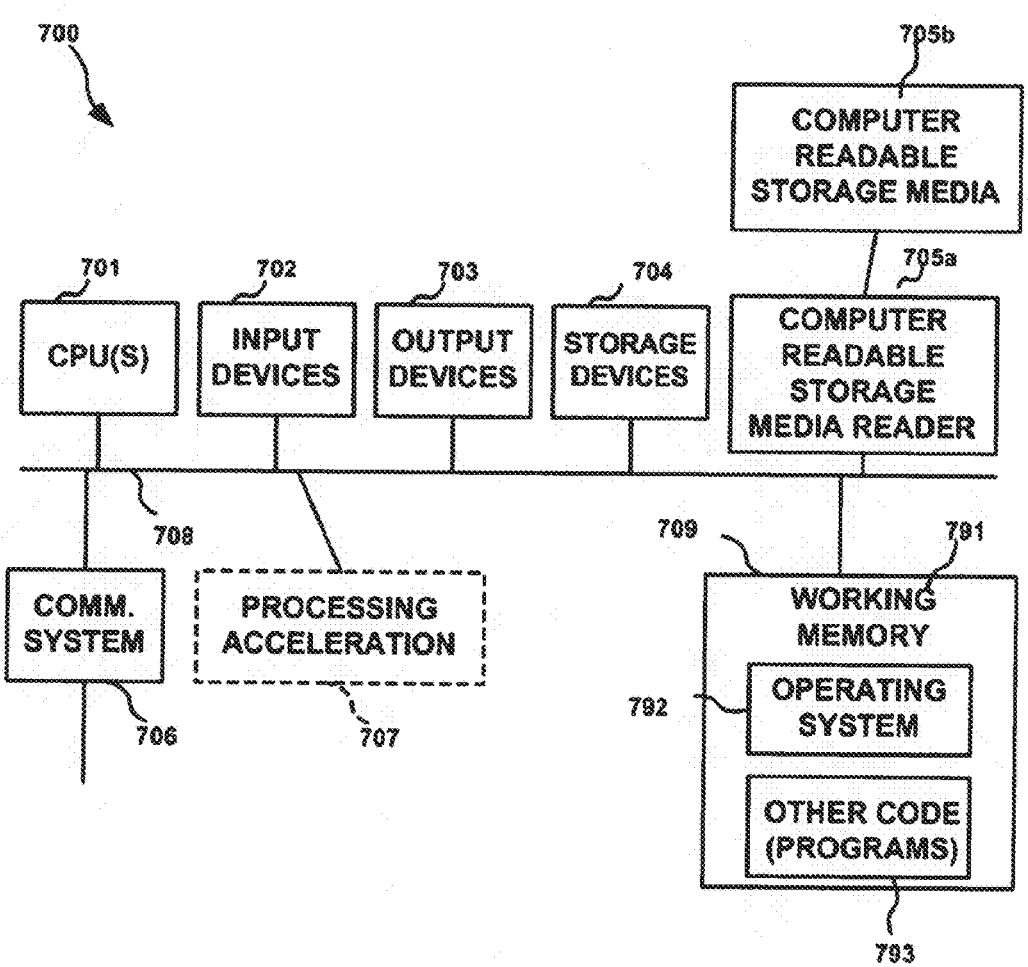
FIG. 7 is a block diagram illustrating a computer system suitable for implementing aspects of at least one embodiment.

FIG. 7 discloses a block diagram of a computer system suitable for implementing aspects of at least one embodiment. The computer system may be used to implement one or more components of the system disclosed herein. For example, in one embodiment, the computer system may be used to implement each of the server, the client computer, and the content-grouping, playlist-creation, or collaborator-recommendation tool stored in an internal memory, a removable memory, or a database. As shown in FIG. 7, the system includes a bus which interconnects major subsystems such as a processor, internal memory (such as a RAM or ROM), an input/output (I/O) controller, removable memory (such as a memory card), an external device such as a display screen via a display adapter, a roller-type input device, a joystick, a numeric keyboard, an alphanumeric keyboard, smart card acceptance device, a wireless interface, and a power supply. Many other devices can be connected. Wireless interface together with a wired network interface (not shown), may be used to interface to a local or wide area network (such as the Internet) using any network interface system known to those skilled in the art.

Many other devices or subsystems (not shown) may be connected in a similar manner.

Also, it is not necessary for all of the devices shown in FIG. 7 to be present to practice an embodiment. Furthermore, the devices and subsystems may be interconnected in different ways from that shown in FIG. 7. Code to implement one embodiment may be operably disposed in the internal memory or stored on storage media such as the removable memory, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system, code for implementing the content-grouping, playlist-creation, or collaborator-recommendation tool may be stored in the internal memory and configured to be operated by the processor or a virtual machine.

Figure 8:
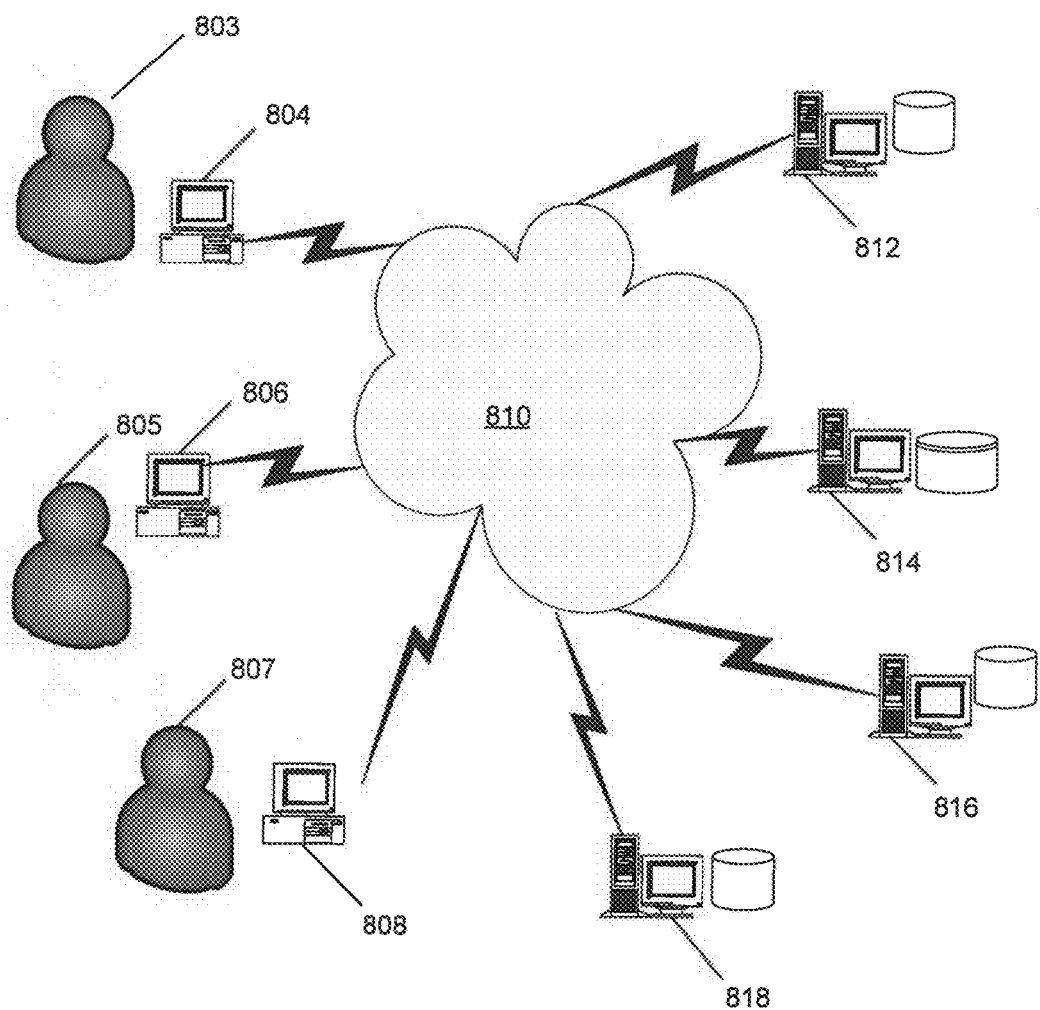
FIG. 8 is a block diagram illustrating a computer system for accomplishing at least one embodiment.

FIG. 8 illustrates an example of a system in which the content-grouping, playlist-creation, or collaborator-recommendation system may be implemented. For example, FIG. 8 shows users 803, 805, and 807 and their associated computers 804, 806, and 808, respectively. Multiple content providing computers 812 and 814, a network 810, at least one database computer 816 and at least one computer 818 for performing the functions described herein.

Figure 9:
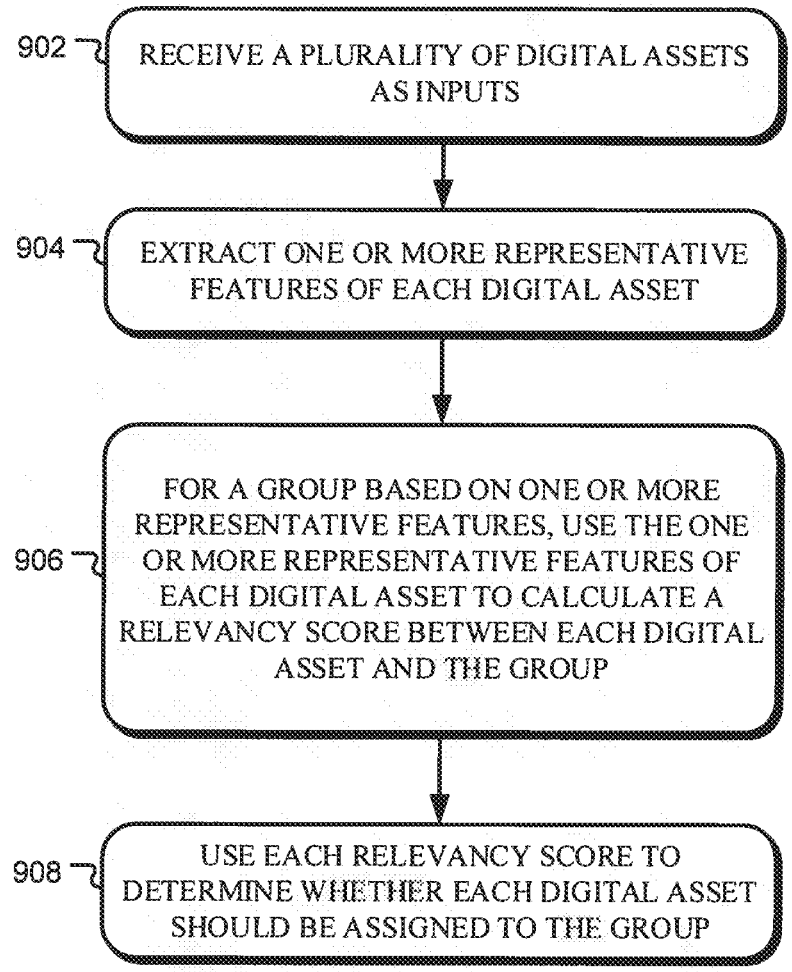
FIG. 9 is a flow chart illustrating an example of assigning a digital asset to a group in accordance with one embodiment.

FIG. 9 illustrates a flow chart 900 demonstrating an example of assigning a digital asset to a group in accordance with one embodiment. In operation 902, a plurality of digital assets are received as inputs. The digital assets are received so that they can be assessed as to which group or groups they can be assigned to. In operation 904, one or more representative features are extracted for each digital asset. These one or more representative features may then be used to calculate a relevancy score between each digital asset and a group, as shown in operation block 906. In operation block 908, a calculated relevancy score for a digital asset can be used to determine whether that particular digital asset should be assigned to the group.

Figure 10:
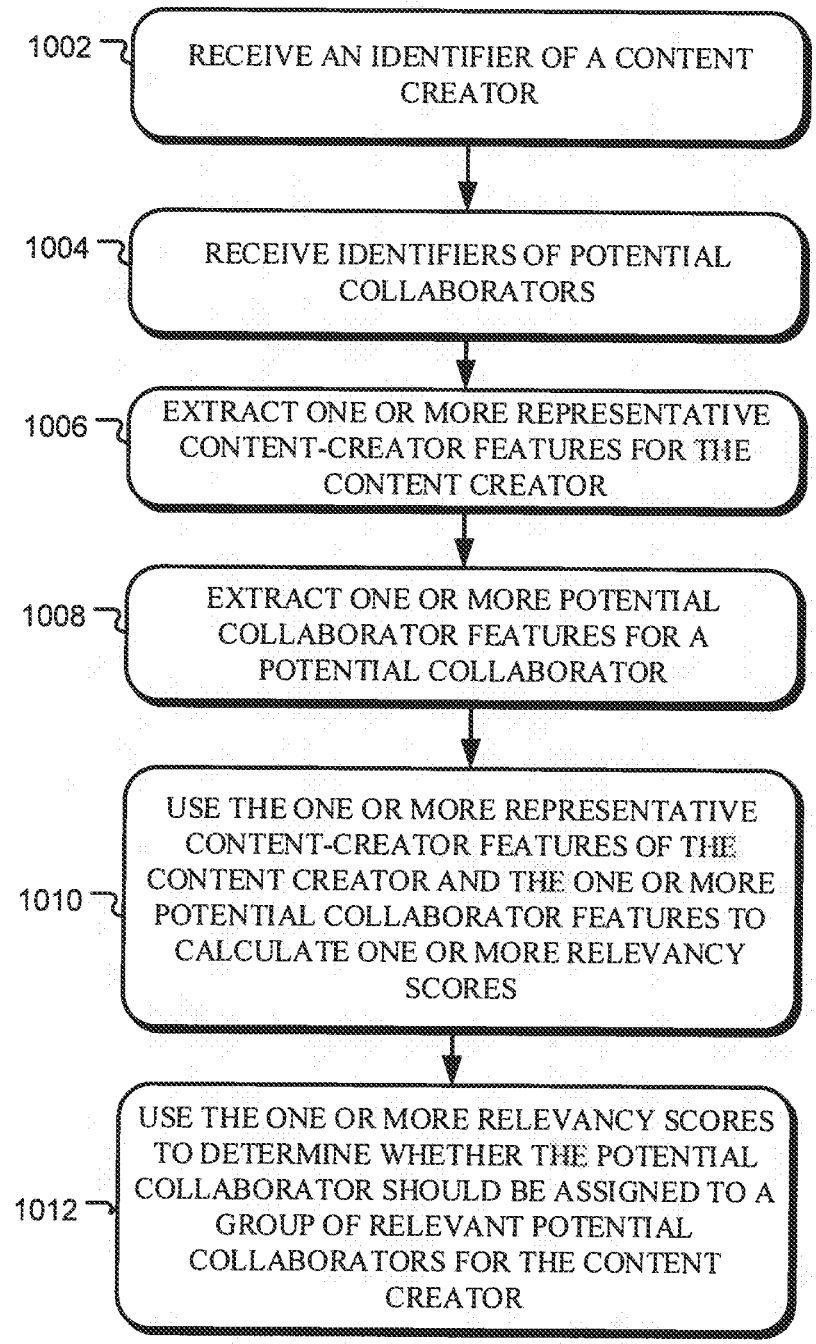
FIG. 10 is a flow chart illustrating an example of how to identify potential collaborators for a content creator, in accordance with one embodiment.

FIG. 10 illustrates a flow chart 1000 demonstrating an example of how to identify potential collaborators for a content creator. In operation block 1002, an identifier of a content creator is received. In operation 1004, an initial group of potential collaborators can be identified by receiving identifiers for them, e.g., names of individuals. In operation 1006, one or more representative content-creator features for the content creator can be extracted. Similarly, for each of the potential collaborators, one or more potential collaborator features can be extracted, as shown in operation 1008. For each potential collaborator, the one or more representative content-creator features and the one or more potential collaborator features can be used to calculate one or more relevancy scores for each potential collaborator, as shown in operation 1010. These relevancy scores can be used to determine whether the potential collaborator should be assigned to a group of relevant potential collaborators for the content creator, as shown in operation 1012. The process can be repeated for each potential collaborator.

Figure 11:
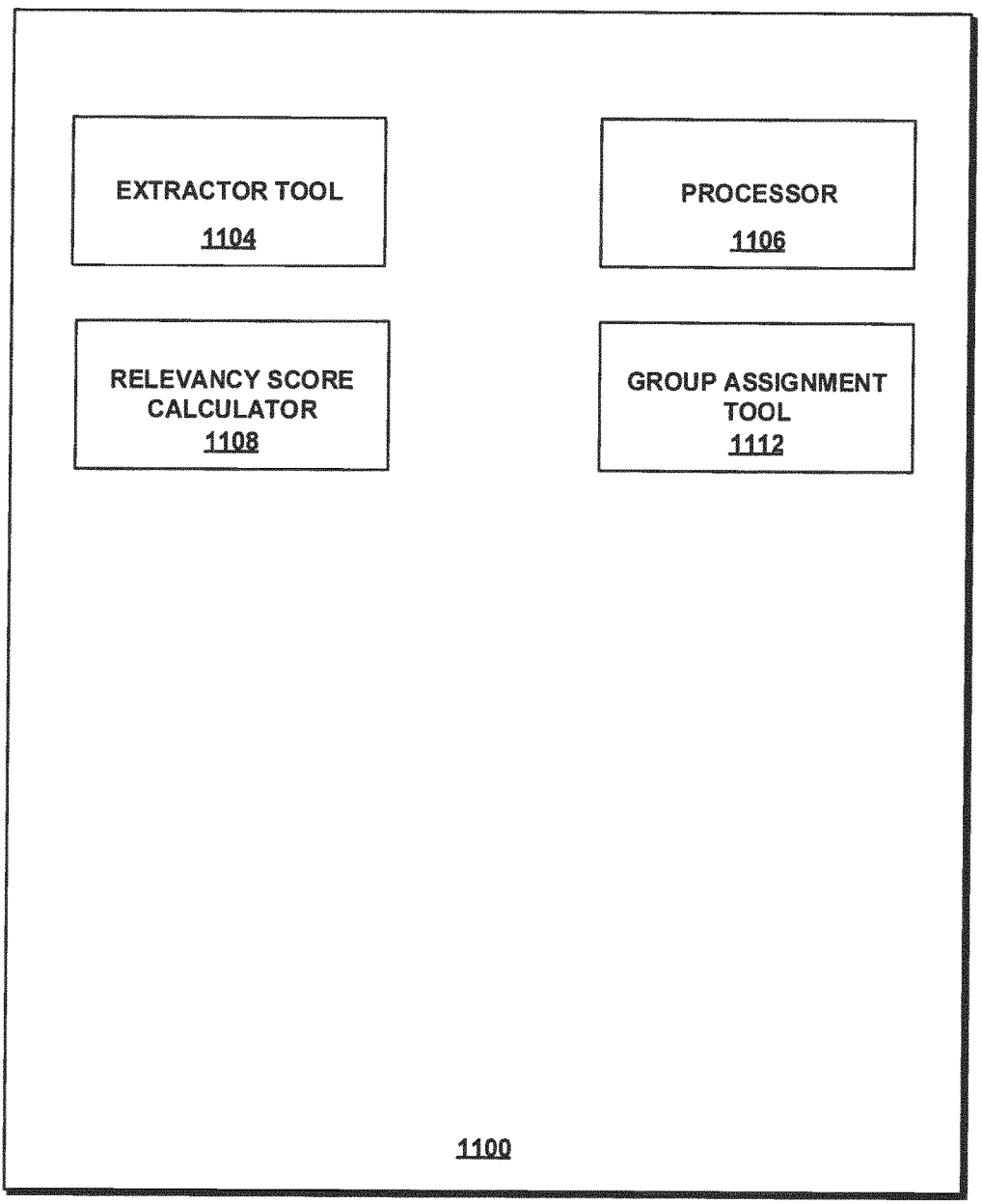
FIG. 11 is block diagram of a computer system for assigning groups in accordance with one embodiment.

FIG. 11 illustrates an embodiment of a computer system for performing the embodiments shown in FIGS. 9 and 10. In computer system 1100, one or more processors 1106 are shown. The processor(s) can be used to run computer code to implement features described herein. FIG. 11 also shows an extractor tool 1104 that can be used to extract features from digital assets or collaborators. Also shown is a relevancy score calculator 1108 for use in calculating relevancy scores. A group assignment tool 1112 is also shown for use in assigning a particular digital asset to a group or a particular potential collaborator to a group, depending on the process being performed.

Figure 12:
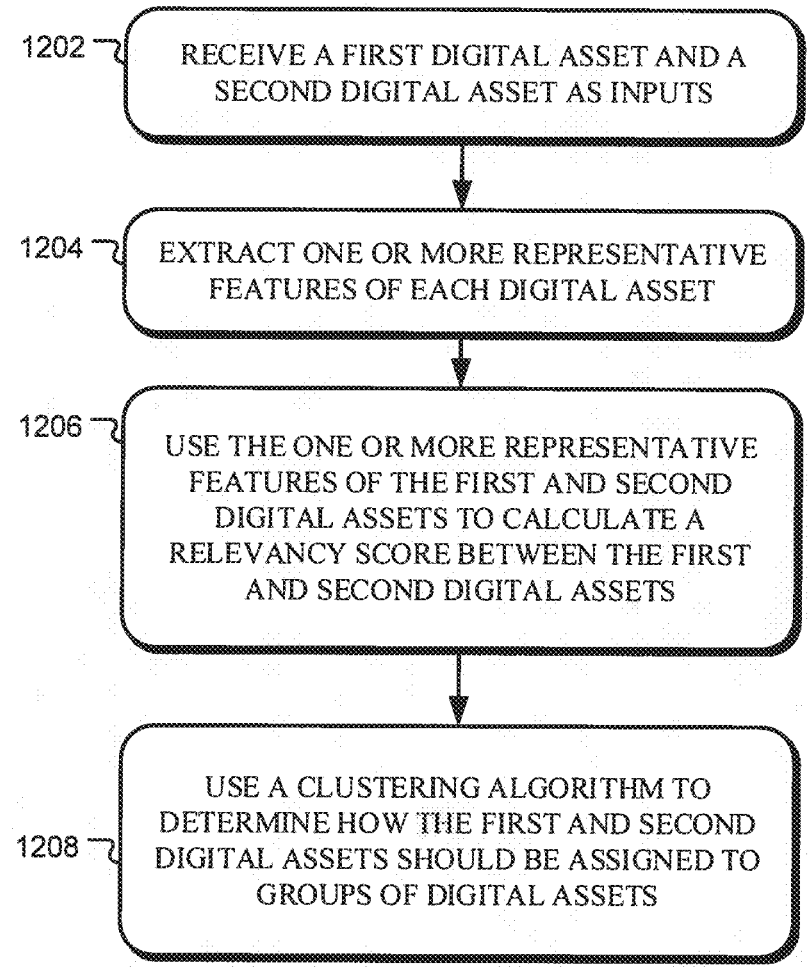
FIG. 12 is a flow chart illustrating an example of how to cluster digital assets in accordance with one embodiment.

FIG. 12 illustrates a flow chart 1200 demonstrating an example of how to assign a digital asset to a group of digital assets based on a clustering operation. In operation block 1202, a first digital asset and a second digital asset are received as inputs. Additional digital assets can be received. One or more representative features can be extracted for each of the digital assets, as shown in operation 1204. These extracted representative features may then be used to calculate a relevancy score between the first and second digital assets, as illustrated by operation block 1206. In operation block 1208, a clustering algorithm is used to determine how the first and second digital assets should be assigned to groups of digital assets.

Figure 13:
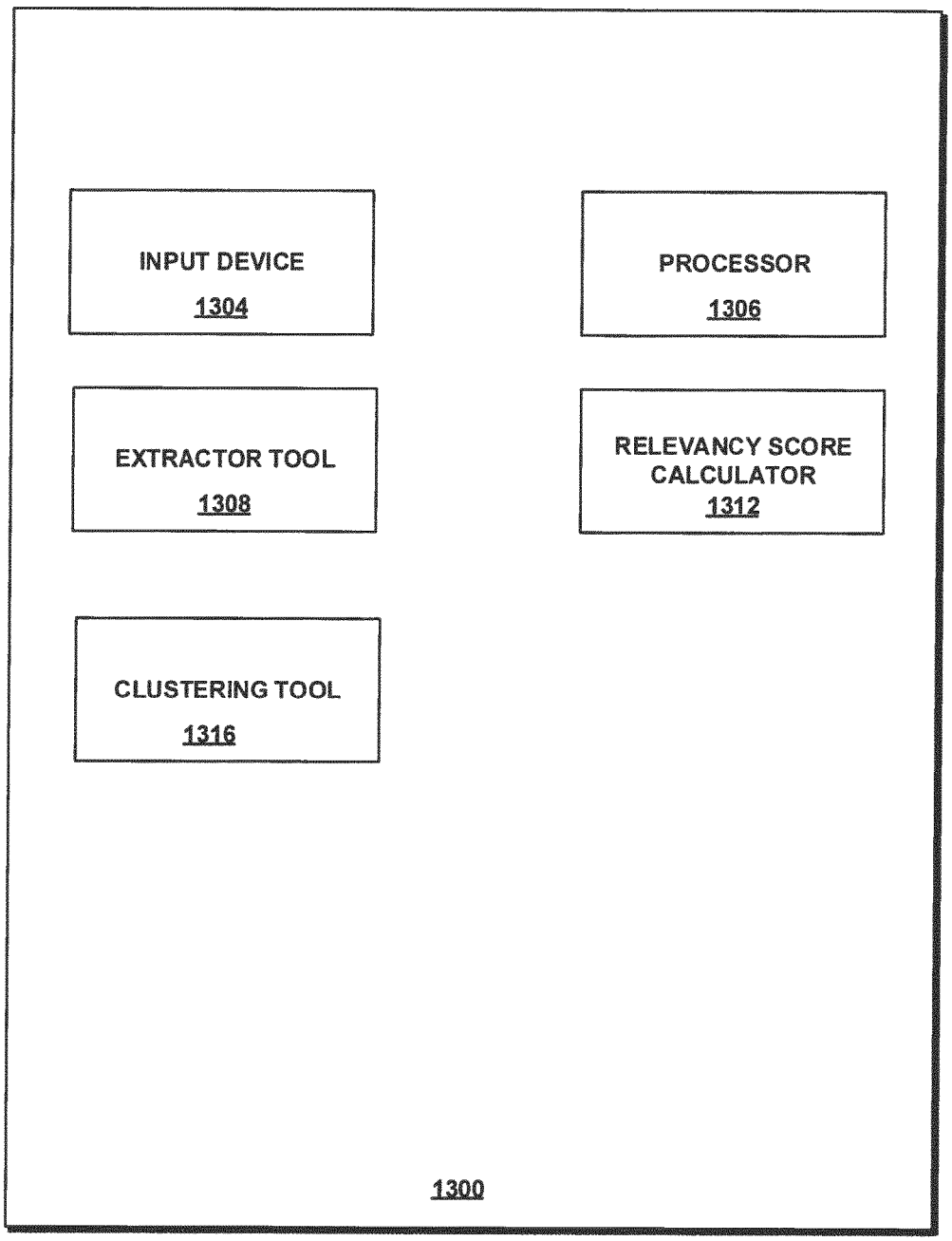
FIG. 13 is a block diagram of a computer system for clustering digital assets in accordance with one embodiment.

FIG. 13 shows an embodiment of a computer system for performing the process illustrated by FIG. 12. A computing system 1300 is shown. One or more processors 1306 can be used to run computer code to implement features described herein. Also shown is an input device 1304 to receive digital asset input. An extractor tool 1308 is shown that can extract features from a particular digital asset. A relevancy score calculator 1312 is shown for use in calculating a relevancy score between any two particular digital assets. And a clustering tool 1316 is shown that can determine how groups of particular digital assets should be clustered based on their relevancy scores.

Applications "Intelligent Supplemental Search Engine Optimization" U.S. patent application Ser. No. 14/028,238; "Intelligent Video Thumbnail Selection and Generation" U.S. patent application Ser. No. 14/051,285; and "Title Rating and Improvement Process and System" U.S. patent application Ser. No. 14/579,145 disclose additional techniques that may be utilized with some of the topics discussed herein. Those applications are hereby incorporated by reference in their entirety and for all purposes.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not necessarily all of the routine functions of the embodiments described herein are shown and described. It will, of course, be appreciated that in the development of any such actual embodiment, numerous implementation-specific decisions must be made in order to achieve the developer's specific goals, such as compliance with application- and business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines.

The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java, PHP, Python, and/or other high level language programs running on a data processing computer such as a personal computer, workstation computer, mainframe computer, or high performance server running an OS such as Microsoft-based OS, such Windows 8, Windows 7, Windows Vista™, Windows NT®, Windows XP PRO, Windows® 2000, and Windows 10, available from Microsoft Corporation of Redmond, Wash., Apple OS X-based systems, available from Apple Inc. of Cupertino, Calif., BlackBerry OS, available from Blackberry Inc. of Waterloo, Ontario, Android, available from Google Inc. of Mountain View, Calif. or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, memory, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising
receiving, by a processor, a plurality of digital assets as inputs;
extracting, by the processor, metadata associated with each of the digital assets, the metadata including one or more representative features of each digital asset;
using a hierarchical representation of topics to calculate a relevancy score between the extracted metadata for each digital asset and a select topic associated with a group, the hierarchical representation of topics defining relationships between different topics; and
using the calculated relevancy score to determine whether each digital asset should be assigned to the group.

2. The method of claim 1 and further comprising: merging, splitting, and/or trimming groups of digital assets into reasonable sizes.

3. The method of claim 1 and further comprising: outputting a group of digital assets as a playlist.

4. The method of claim 1 and further comprising: using a quality, relevancy, or chronological metric to rank digital assets of the group.

5. The method of claim 1 and further comprising:
using the representative features for each digital asset along with representative features from other digital assets to determine suggested group titles.

6. The method of claim 1, wherein the extracted metadata includes at least one topic associated with each digital asset.

7. A computer system comprising:
one or more computer processors;
an extractor tool configured to use the one or more computer processors to extract metadata associated with a digital asset, the metadata including one or more representative features of the digital asset;
a relevancy score calculator configured to use a hierarchical representation of topics to calculate a relevancy score between the extracted metadata associated with the digital asset and a select topic associated with a group of digital assets, the hierarchical representation of topics defining relationships between different topics;
a group assignment tool configured to use the relevancy score to determine whether the digital asset should be assigned to the group of digital assets.

8. The computer system of claim 7 and further comprising:
an output tool configured to merge, split, and/or trim groups of digital assets into reasonable sizes.

9. The computer system of claim 7 and further comprising: an output tool configured to output a group of digital assets as a playlist.

10. The computer system of claim 7 and further comprising:
a ranking tool configured to use a quality, relevancy, or chronological metric to rank digital assets of the group.

11. The computer system of claim 7 and further comprising:
a title suggesting tool configured to use the representative features of the digital asset along with representative features of other digital assets to determine suggested group titles.

12. A method comprising:
receiving an identifier of a content creator;
receiving identifiers of potential collaborators;
extracting, by a processor, one or more representative content-creator features from metadata associated with digital media content uploaded by the content creator, the extracted content-creator features including demographic information characterizing the content creator or characterizing viewers of the digital media content uploaded by the content creator;
extracting, by the processor, one or more potential collaborator features from metadata associated with digital media content uploaded by a potential collaborator, the extracted potential-collaborator features including demographic information characterizing the potential collaborator or characterizing viewers of the digital media content uploaded by the potential collaborator;
using the one or more representative content-creator features of the content creator and the one or more potential collaborator features to calculate one or more relevancy scores; and
using the one or more relevancy scores to determine whether the potential collaborator should be assigned to a group of relevant potential collaborators for the content creator.

13. The method of claim 12 and further comprising:
identifying a content distribution channel and a plurality of potential collaborating content distribution channels.

14. The method of claim 13 and further comprising:
using the content distribution channel as a filter to screen an initial set of prospective collaborators.

15. The method of claim 14 and further comprising:
using content distribution channel statistics as a filter to screen the initial set of prospective collaborators.

16. The method of claim 12 wherein using the one or more relevancy scores to determine whether the potential collaborator should be assigned to the group of relevant potential collaborators for the content creator comprises:
using a machine learning algorithm to design a fusing formula for applying the one or more relevancy scores of the potential collaborator.

17. The method of claim 12, wherein the content-creator features include demographic information characterizing the content creator and the potential-collaborator features include demographic information characterizing the potential collaborator.

18. The method of claim 12, wherein the content-creator features include audience demographic information characterizing viewers of the digital media content uploaded by the content creator and the potential-collaborator features include audience demographic information characterizing viewers of the digital media content uploaded by the potential collaborator.

19. A computer system comprising:
one or more computer processors;
an extractor tool configured to use the one or more computer processors to extract one or more representative content-creator features from metadata associated with digital media content uploaded by a content creator, the extracted content-creator features including demographic information characterizing the content creator or characterizing viewers of the digital media content uploaded by the content creator;

an extractor tool configured to use the one or more computer processors to extract one or more representative potential-collaborator features from metadata associated with digital media content uploaded by a potential collaborator, the extracted potential-collaborator features including demographic information characterizing the potential collaborator or characterizing viewers of the digital media content uploaded by the potential collaborator;

a relevancy score calculator configured to use the one or more representative content-creator features of the content creator and the one or more potential-collaborator features of the potential collaborator to calculate a relevancy score; and a group assignment tool configured to use the one or more relevancy scores to determine whether the potential collaborator should be assigned to a group of relevant potential collaborators for the content creator.

20. The computer system of claim 19 and further comprising: an input tool to receive as an input an identifier of a content distribution channel.

21. The computer system of claim 20 and further comprising:

a filter configured to use the content distribution channel to screen an initial set of prospective collaborators.

22. The computer system of claim 21 wherein the filter is configured to use content distribution channel statistics to screen the initial set of prospective collaborators.

23. The computer system of claim 19 wherein the extractor tool uses viewer demographics as a content-creator feature.

24. A method comprising:

receiving a plurality of digital assets as inputs;

extracting metadata associated with each of the digital assets using a processor, the metadata including one or more representative features of each digital asset;

using a hierarchical representation of topics to calculate a relevancy score between the extracted metadata for each one of the digital assets and a select topic associated with a group, the hierarchical representation of topics defining relationships between different topics; and executing a clustering algorithm by a processor to form digital asset groups, wherein the first and second digital assets are added to a same one of the digital asset groups if the calculated relevancy score satisfies a predetermined condition.

* * * * *